United States Patent Office 3,423,909
Patented Jan. 28, 1969

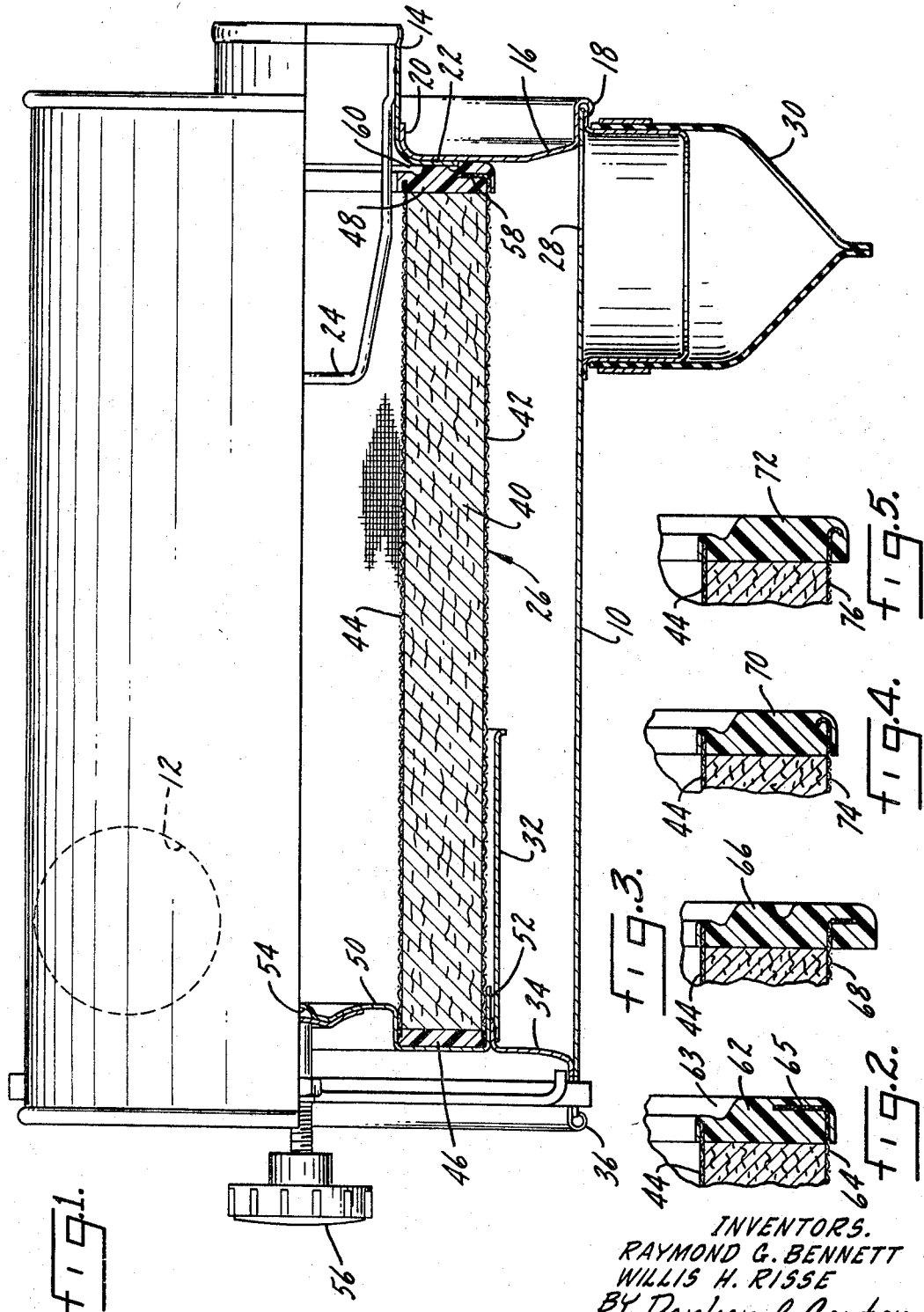

3,423,909
AIR CLEANER WITH IMPROVED FILTER ELEMENT ASSEMBLY
Raymond G. Bennett, Olympia Fields, and Willis H. Risse, Flossmoor, Ill., assignors to Novo Industrial Corporation—United Air Cleaner Division, New York, N.Y., a corporation of New York
Filed Sept. 28, 1967, Ser. No. 671,428
U.S. Cl. 55—498      4 Claims
Int. Cl. B01d 46/10

ABSTRACT OF THE DISCLOSURE

An air cleaner of the dry type, said cleaner comprising a housing, an air inlet, a clean air outlet, an opening for dust removal and a filter element for removing the remaining dirt from the air to be filtered. The air to be filtered is directed from the inlet inwardly through the filter element to the clean air outlet without any air escaping before it is filtered due to an improved filter element assembly.

---

This invention relates to air cleaners of the dry type, and more particularly to an air cleaner having an improved construction, design and operation including an improved filter element assembly.

Accordingly, a primary object of this invention is an improved dry filter element assembly for air cleaning devices.

A further object is an air cleaner with a filter element mounted therein to provide a tight, rigid seal at the air outlet.

Another object is an air cleaner with a uniquely designed filter element which eliminates cutting or damaging of the sealing material.

Another object is an improved air cleaner having a compact and efficient filter element requiring less maintenance.

Other objects and advantages will appear from time to time in the ensuing specification and drawings in which:

FIGURE 1 is a side elevation view of an air cleaner partly in section;

FIGURE 2 is an enlarged partial section view of another embodiment of this invention;

FIGURE 3 is an enlarged partial section view of another form of the filter element assembly for this invention;

FIGURE 4 is an enlarged partial section view of still another form of the filter element assembly, and FIGURE 5 is an enlarged partial section view of yet another embodiment of the filter element assembly.

Referring to the drawings in more detail, it will be seen that this air cleaning device includes a cylindrical cover or housing 10 having a tangential air inlet 12 and a centrally or axially disposed air outlet 14. The air inlet 12 is preferably tangent to the cylindrical housing 10 so that incoming air will flow into the cylindrical housing along the outer periphery of the housing wall.

An annular end plate 16 is preferably fastened to the housing 10 at one end as at 18, and may be fastened in any suitable manner. The annular end plate or wall member 16 has an inner annular flange 20 which may be secured, as at 22, to the air outlet. The outlet 14 preferably has a wire type pilot member 24 projecting into the interior of the assembly. The pilot member is used as a guide for aligning a filter cartridge or filter element 26 during assembly or replacement.

The outlet end of the housing is provided with a suitable port or opening 28 for removal of accumulated dust or dirt. As shown in FIGURE 1, a dust jar or dust unloader 30 is attached to the housing beneath the outlet to receive the discharged material.

The inlet end of the housing has a cylindrical shroud or shield 32 which projects into the housing, and is preferably uniformly spaced from the inside of the housing. This shield is attached to a flanged member 34 which in turn is suitably attached to the housing, as at 36.

A filter cartridge or filter element 26 is positioned in the housing, and may include an inner screen or inner sleeve 44 preferably made from galvanized wire mesh. The inner screen is surrounded by a suitable filter material 40 which may take a variety of forms including polyurethane foamed plastic, but is preferably pleated paper. It should be noted that the density of the filter material may increase inwardly so that various stages of filtering intensity may be acquired.

The filter material 40 may be surrounded by an outer screen or outer sleeve 42 which may also be made from galvanized wire mesh. In addition, the ends of the filter material are enclosed by gaskets or seals 46 and 48 preferably made from molded plastisol. Seal 46 is a second seal at the second end of the filter element and seal 48 is a first seal at the first end of the filter element.

One end of the filter element 26 is held firmly in place by an end cap 50 which may be turned down at its ends as at 52. The middle portion of the end cap helps form a socket or depression 54 for receiving a screw or stud 56. The screw or stud may be turned to apply an axial thrust to the filter element 26, and will force the molded plastisol gasket 48 into tight sealing engagement with the outlet 14 and end plate 16. The result is a tight rigid seal at the outlet 14.

As shown in FIGURE 1, both the inner screen 44 and outer screen 42 are molded into the gasket 48 made from plastisol or some similar material. In addition, it is important to note that the outer screen 42 is flanged or bent inwardly as at 58. Thus, the thrust of the filter element 26 is taken by the gasket 48 without a sharp edge of the screen tending to cut through the gasket. Further, it is not necessary to do the same thing to the inner screen 44 since the gasket 48 has been cut back in the area 60 so that the thrust load is not carried by the gasket portion opposite the inner screen.

As mentioned, it is desirable that the thrust load does not cut through the gasket. This may be accomplished by cutting back a portion of the gasket opposite one of the screens and providing the other screen with a blunt surface for receiving the thrust load. FIGURES 2 through 5 show modified forms for cutting back a portion of the gasket and bending or rolling over one of the screens.

In FIGURE 2 the gasket 62 is cut back opposite the inner screen 44, and forms a circumferential depression as at 63, and the outer screen 64 is bent or turned in, as at 65, to provide a blunt surface for receiving the thrust load. FIGURE 3 shows the gasket 66 cut back opposite the inner screen 44 forming two ridges which rest up against the air outlet forming a tight rigid seal. In addition, the outer screen 68 is bent outwardly to provide a blunt surface for receiving the thrust load. In FIGURES 4 and 5 the gasket 70 or 72 is cut back opposite the inner screen 44 in a manner similar to that shown in FIGURE 2 while the outer screen 74 or 76 is either rolled in as shown in FIGURE 4 or rolled out as shown in FIGURE 5.

The use, operation and function of this invention are as follows:

Air to be cleaned is brought into the housing 10 through the air inlet 12 and moves in a swirling motion toward the air outlet 14. The swirling or rotating motion of the air is caused by the shield 32 and centrifuges the dirt to the outside. By both centrifugal force and gravity the dirt passes through the dust port 28 into the dust jar 30 thereby removing a substantial amount or dirt present in the air. The remaining dust and dirt are removed when the air flows inwardly through the filter element 26. The clean air then flows axially through the air outlet 14.

In operation the screw or stud 56 applies an axial thrust to the filter element 26 at the center of the end cap 50 to seal the assembly at the air outlet 14. The seal is accomplished by molding the inner screen and outer screen into a gasket preferably made from plastisol. The gasket is preferably cut back in the space opposite the inner screen 44 so that the gasket does not rest up against the outlet 14 opposite that particular screen. By cutting back the gasket opposite the inner screen, all of the thrust will be taken by the gasket portion opposite the outer screen. In this manner the sealing will be effected by the gasket portion opposite the turned or bent over ends of the outer screen thus eliminating the tendency of the thrust load to cut through the gasket. It is important to note that the cut back portion shown and described as opposite the inner screen 44 may be opposite either screen reversing the affect of the thrust load on the respective screens.

We claim:
1. An air cleaner of the dry type having a housing, an air inlet, a wall member, a clean air outlet through said wall member and an opening for dust removal, and a filter element assembly including:
   a generally cylindrical outer screen mounted in the housing to separate coarser matter from finer matter,
   a porous filter element concentrically disposed within the outer screen through which the incoming air is passed to separate out matter in suspension,
   an inner screen concentrically disposed within said porous filter element, said inner screen being wire mesh to separate out additional matter passing through the assembly,
   a first and second sealing means at the respective first and second ends of the filter element, the ends of the inner and outer screens molded into said sealing means for providing a seal for said filter element assembly; said filter element assembly being disposed within said housing coaxially with said clean air outlet, said first sealing means engaging said wall member around said clean air outlet,
   a thrust producing means operatively associated with said housing for applying a thrust parallel to the cylindrical axis of said screens to the second of said sealing means, said thrust producing means urging the first sealing means into sealing engagement with said wall member and providing a tight and compact seal against said wall member,
   said first sealing means having a continuous cut back portion forming a circumferential depression at and immediately adjacent to only one of the screens for transferring said thrust to the portion of the sealing means opposite the other screen, and
   the end of the screen in the portion of the sealing means receiving said thrust being flanged and providing a blunt surface and preventing the screen from cutting through the sealing means.

2. The structure of claim 1 further characterized in that the cut back portion forming the depression in the sealing means is opposite the inner screen and further, the end of the outer screen is flanged to provide a blunt surface for receiving said thrust.

3. The structure of claim 1 further characterized in that the filter element is made from pleated filter paper.

4. The structure of claim 1 further characterized in that said first and second sealing means are each made from molded plastisol.

References Cited

UNITED STATES PATENTS

| | | | |
|---|---|---|---|
| 1,951,956 | 3/1934 | Wood | 55—510 X |
| 2,732,031 | 1/1956 | Rabbitt et al. | 55—502 X |
| 2,752,005 | 6/1956 | Avera et al. | 55—440 X |
| 2,895,174 | 7/1959 | Hockett. | |
| 2,919,765 | 1/1960 | Kasten. | |
| 2,929,464 | 3/1960 | Sprouse | 55—525 X |
| 2,941,620 | 6/1960 | Thornburgh | 55—502 X |
| 3,026,968 | 3/1962 | Koskinen | 55—525 |
| 3,048,959 | 8/1962 | Lowther | 55—320 |
| 3,078,650 | 2/1963 | Anderson et al. | 55—337 |
| 3,118,837 | 1/1964 | Briggs | 210—493 X |
| 3,137,039 | 6/1964 | Von Moose St. John. | |
| 3,143,997 | 8/1964 | Norberg et al. | 116—114 |
| 3,226,917 | 1/1966 | Donovan et al. | 55—276 |
| 3,307,336 | 3/1967 | Dewsberry | 55—432 X |
| 3,319,404 | 5/1967 | Lowther | 55—432 |

FOREIGN PATENTS

| | | |
|---|---|---|
| 915,332 | 7/1946 | France. |
| 497,020 | 12/1938 | Great Britain. |
| 907,747 | 10/1962 | Great Britain. |
| 585,214 | 11/1958 | Italy. |

HARRY B. THORNTON, *Primary Examiner.*

DENNIS E. TALBERT, Jr., *Assistant Examiner.*

U.S. Cl. X.R.

55—500, 502, 510; 210—493